United States Patent
Yuan et al.

(10) Patent No.: US 9,798,852 B2
(45) Date of Patent: Oct. 24, 2017

(54) METHODS OF DESIGN RULE CHECKING OF CIRCUIT DESIGNS

(71) Applicant: GLOBALFOUNDRIES Inc., Grand Cayman (KY)

(72) Inventors: Lei Yuan, Cupertino, CA (US); Jongwook Kye, Pleasanton, CA (US); Harry J. Levinson, Saratoga, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 7 days.

(21) Appl. No.: 15/040,235

(22) Filed: Feb. 10, 2016

(65) Prior Publication Data

US 2016/0378906 A1    Dec. 29, 2016

Related U.S. Application Data

(60) Provisional application No. 62/185,991, filed on Jun. 29, 2015.

(51) Int. Cl.
*G06F 17/50* (2006.01)
*H01L 21/027* (2006.01)

(52) U.S. Cl.
CPC ........ *G06F 17/5081* (2013.01); *H01L 21/027* (2013.01); *G06F 2217/12* (2013.01)

(58) Field of Classification Search
CPC .................................................. G06F 17/5081
USPC ........................................................... 716/52
See application file for complete search history.

(56) References Cited

U.S. PATENT DOCUMENTS

| | | | |
|---|---|---|---|
| 9,563,737 B1* | 2/2017 | Arkhipov et al. | 716/102 |
| 2011/0029939 A1* | 2/2011 | Yang et al. | 716/55 |
| 2013/0254727 A1* | 9/2013 | Fang | G06F 17/5081 716/102 |
| 2015/0302134 A1* | 10/2015 | Berkens | 716/102 |

* cited by examiner

*Primary Examiner* — Suchin Parihar
(74) *Attorney, Agent, or Firm* — Heslin Rothenberg Farley & Mesiti P.C.

(57) ABSTRACT

Methods for performing design rule checking of a circuit design are provided. The methods include, for instance: providing a circuit design for an integrated circuit layer, in which the circuit design includes a plurality of design lines oriented in a particular direction; and automatically performing a design rule check of the circuit design, which may include forming a verification pattern for the circuit design, the verification pattern comprising a plurality of verification lines and a plurality of verification regions, wherein one or more verification regions are associated with and connected to one verification line of the plurality of verification lines, and checking the verification pattern for any verification line overlapping a verification region. The circuit design may be considered to fail the design rule check if an end of one verification line overlaps any verification region associated with another verification line of the verification pattern.

20 Claims, 10 Drawing Sheets

METHODS OF DESIGN RULE CHECKING OF CIRCUIT DESIGNS

CROSS-REFERENCE TO RELATED APPLICATION

This application claims the benefit of U.S. Provisional Patent Application No. 62/185,991, filed Jun. 29, 2015, which is hereby incorporated herein by reference in its entirety.

FIELD OF THE INVENTION

The present invention relates to performing design rule checking of a circuit design, and more particularly, performing design rule checking with a design rule checking tool according to a verification pattern.

BACKGROUND OF THE INVENTION

As the dimensions of features of semiconductor devices continue to be reduced, lithographic techniques and tools may need to be modified to accurately form functioning integrated circuit devices. Many techniques intended to adapt existing lithography tools to new fabrication demands, such as self-aligned double-patterning (SADP) processes, may involve multiple steps and patterning masks to form a finished integrated circuit layer according to a circuit design. In SADP processes, unidirectional lines are first formed, for example, by use of spacer process and a subsequent block mask step, using a block mask pattern, may be applied to form the line ends. SADP process may be implemented to manufacture a metal route layout. The route layout for metal line formation is often generated by automation tools following a set of predefined metal design rules. For the reason of routing efficiency, an EDA route tool often forms only metal line patterns and does not perform the block mask step. Consequently, the route layout may not successfully pass a block mask design rule check. Therefore, there is a need to develop a method of metal line design rule check that can ensure passing block mask design rule check.

BRIEF SUMMARY

Various shortcomings of the prior art are overcome, and additional advantages are provided through the provision, in one aspect, of a method including: providing a circuit design for an integrated circuit layer, the circuit design including a plurality of design lines oriented in a same defined direction; automatically performing a design rule check of the circuit design by a design rule checking tool, in which the automatically performing includes: forming, by the design rule checking tool, a verification pattern for the circuit design, the verification pattern having a plurality of verification lines and a plurality of verification regions, the verification lines being defined, in part, by one or more adjacent design line ends, and wherein one or more verification regions of the plurality of verification regions are defined, in part, by one or more critical dimensions of the circuit design and are associated with and connected to one verification line of the plurality of verification lines; and, checking, by the design rule checking tool, the verification pattern for any verification line overlapping a verification region.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages, and details thereof, are explained more fully below with reference to the non-limiting examples illustrated in the accompanying drawings. Descriptions of well-known materials, fabrication tools, processing techniques, etc, are omitted so as not to unnecessarily obscure the invention in detail. It should be understood, however, that the detailed description and the specific examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Generally stated, provided herein, in one aspect, is a method including: providing a circuit design for an integrated circuit layer, the circuit design including a plurality of design lines oriented in a defined direction; automatically performing a design rule check of the circuit design by a design rule checking tool, in which the performing includes: forming a verification pattern for the circuit design, the verification pattern having a plurality of verification lines and a plurality of verification regions, the verification lines being defined, in part, by one or more adjacent design line ends, and wherein one or more verification regions of the plurality of verification regions are defined, in part, by one or more critical dimensions of the circuit design and are associated with and connected to one verification line of the plurality of verification lines; and, checking the verification pattern for any verification line overlapping a verification region.

Reference is made below to the drawings, which are not drawn to scale for ease of understanding, wherein the same reference numbers used throughout different figures designate the same or similar components.

Figure 1:
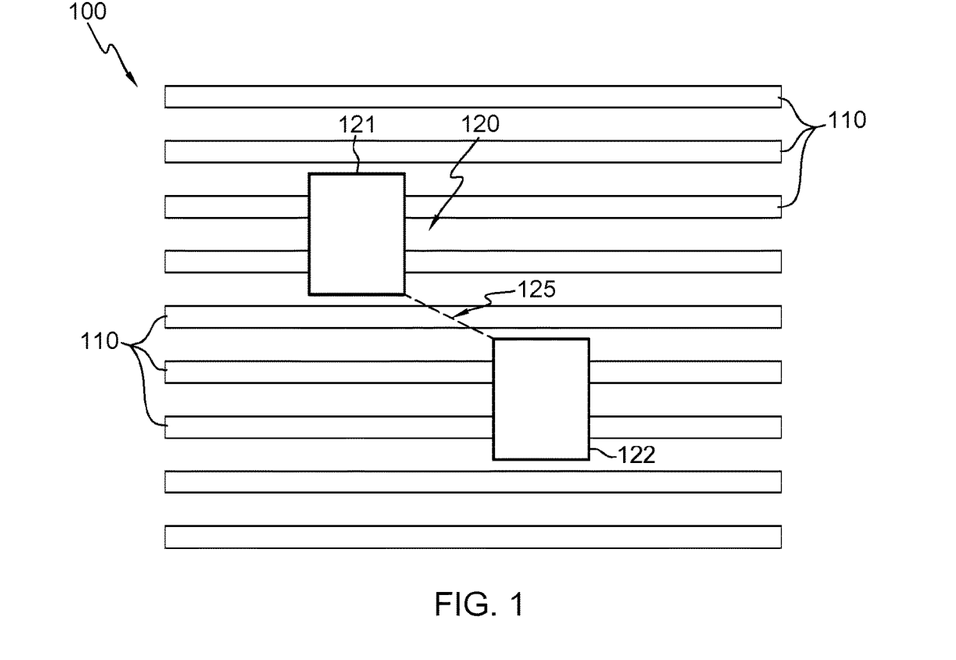
FIG. 1 depicts one embodiment of a circuit design overlaid with a portion of a blocking mask, illustrating some of the issues associated with various circuit layer fabrication techniques.

FIG. 1 depicts one embodiment of a circuit design 100 overlaid by a portion of a block mask pattern 120. Circuit design 100 may include a plurality of design lines 110 oriented in a defined direction. Design lines 110 may have varying lengths and may, as illustrated in FIG. 1, have a uniform line width. Design lines 110 of circuit design 100 may correspond, for example, to metallization lines of a circuit structure, raised fin structures, gate structures, or other features of an integrated circuit layer. Fabricating an integrated circuit layer according to circuit design 100 may include, for example, a self-aligned double-patterning process (SADP). Routing tools may frequently be used for patterning processes such as SADP due to their ability to rapidly pattern linear circuit layer features, such as a pattern of metal lines corresponding to design lines 110. A decomposition tool may subsequently be used to generate a block mask pattern and continue patterning of the circuit structure. Design lines patterned by a routing tool generally need to be formed so that a corresponding block mask pattern generated by the decomposition tool will pass a design rule check. Because routing tools are generally configured only to generate design lines and not block mask patterns, in order to preserve the efficiency and speed of the routing tool, routing tools may only be configured to perform a design rule check according to design lines 110 which may not ensure that a corresponding block mask pattern will pass a design rule check.

Individual block masks of a block mask pattern generally must be separated from each other by a defined minimum separation, for example, the separation 125 between block masks 121 and 122 of block mask pattern 120 must be equal to or greater than a defined minimum separation for block mask pattern 120. This minimum separation of block masks may be necessary, in part, because of light diffraction at or near the edges of individual block masks. Additionally, block masks 121 and 122 generally must have minimum length dimensions, such as a minimum height and minimum width, to facilitate minimizing diffraction effects. Such defects in resulting metal lines may short a circuit or allow electrical connections between circuit features that must be electrically isolated. As block mask patterns are often generated automatically according to circuit designs, an automated design rule check (DRC) process may be applied to either or both the circuit design and block mask pattern, prior to actual fabrication of the circuit layer, to ensure that the routing tool will accurately reproduce the intended circuit design on the fabricated circuit layer without significant defects.

Figure 2A:
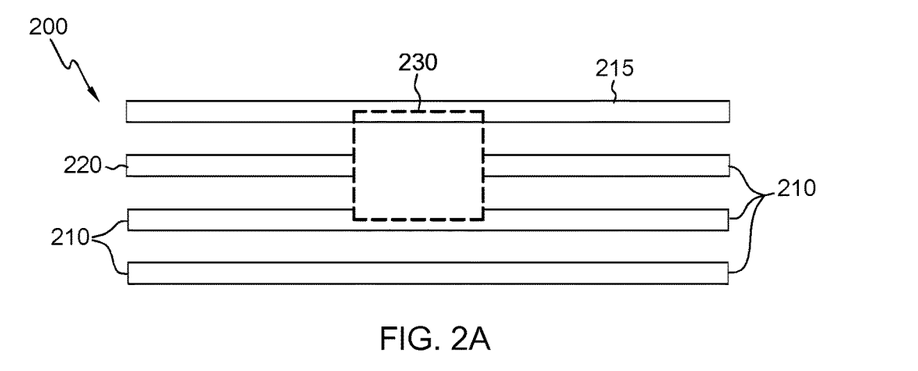
FIGS. 2A-2B depict embodiments of portions of circuit designs undergoing design rule checking.
Figure 2B:
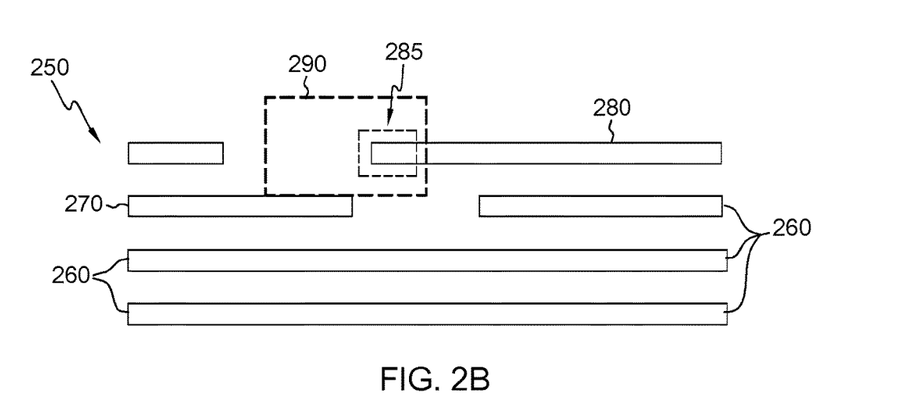

FIGS. 2A and 2B depict example embodiments of how a design rule check process may be applied to circuit designs in order to ensure that the circuit design and/or block mask pattern meet one or more design rules, such as a minimum separation of block masks or minimum length dimensions of block masks. Design rule checks may involve, for example, identifying individual ends of design lines in a circuit design, and forming one or more "keep-out" regions associated with each end of a design line. The "keep-out" regions, sometimes also called "forbidden regions," are so named because design line ends must be kept out of the "keep-out" regions. Keep-out regions may be rectangular regions, and may have height and width dimensions defined by one or more critical dimensions of the circuit design and/or a block mask pattern intended for use with the circuit design. A design rule check process may look for any design line end falling within a keep-out region associated with another design line end. If a design line end is found within a keep-out region, the circuit design (or at least that portion of the circuit design) fails the design rule check. In general, if no end of a design line falls within the keep-out regions of any other design lines, then a corresponding block mask pattern should have large enough block masks separated by at least a defined minimum separation, and the circuit design thus may pass the design rule check. For example, FIG. 2A depicts a portion of an embodiment of a circuit design 200 having a plurality of design lines 210, 215, and 220. One example keep-out region 230 associated with an end of design line 220 is shown; in practice, the end of any one design line may have multiple keep-out regions associated with it. In this example, keep-out region 230 is connected to design line 220 and centered on the end of design line 220. As FIG. 2A illustrates, no end of any other design line 210, 215 falls within the keep-out region 230 for the end of design line 220, as desired. It may be noted that due to the defined dimensions of keep-out region 230, a portion of design line 215 does fall within keep-out region 230, but because this portion is not an end of design line 215 the design does not fail the design rule check.

FIG. 2B depicts a portion of an embodiment of another circuit design 250 having a plurality of design lines 260, 270, 280. One example keep-out region 290 associated with an end of design line 270 is depicted; here, keep-out region 290 is connected to a side of design line 270, with the connecting side of keep-out region 290 centered at the end of design line 270. As FIG. 2B illustrates, an end 285 of design line 280 falls within keep-out region 290 of design line 270. Thus, circuit design 250 would fail the design rule check; in practice, if this circuit design and a corresponding block mask pattern were used, the resulting circuit layer would likely have one or more defectively formed lines due to the close proximity of the block masks in the block mask pattern.

Figure 3A:
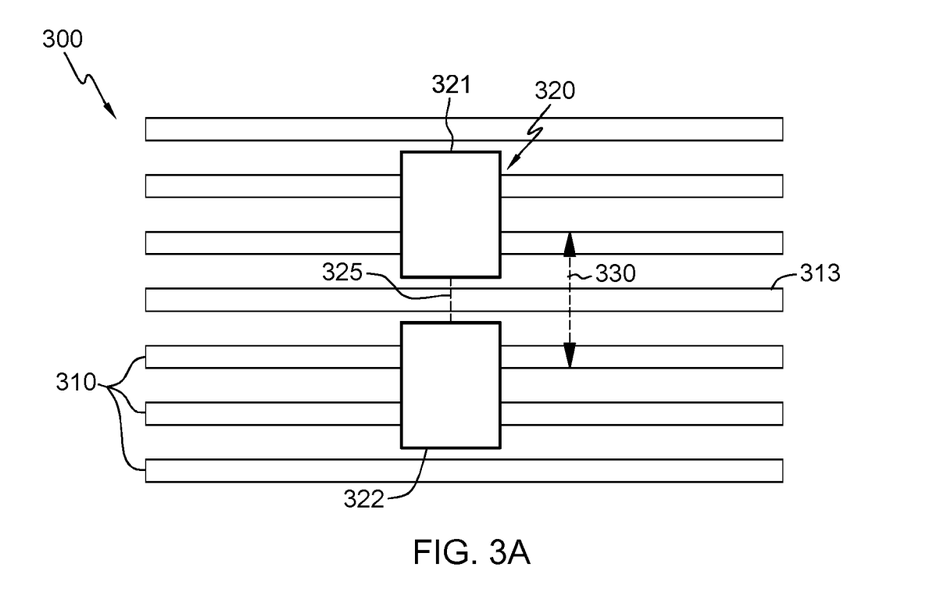
FIGS. 3A-3D depict embodiments of similar circuit designs undergoing design rule checking, illustrating certain problems and limitations of design rule checking processes.

For the reason of routing efficiency, SADP routing often generates only design line patterns, such as metal interconnection design line patterns, but not block mask patterns. Therefore, SADP route tool can only check design line rules, which may have several limitations, however, and such limitations may result in a design rule check passing a routing design that should fail block mask design rule. FIGS. 3A-3D illustrate some of these limitations. FIG. 3A depicts an embodiment of a circuit design 300 that may be generated by a SADP route tool and an associated block mask pattern 320 that may be used with circuit design 300 to form a circuit layer. It is may be noted that block mask pattern 320 is generated after metal line design routing by a decomposition process and is not visible in the routing process. As FIG. 3A illustrates, circuit design 300 includes a plurality of design lines 310, with one uninterrupted design line 313 in the middle. To form a circuit layer according to circuit design 300, a block mask pattern 320 may be generated by an additional decomposition process. In the embodiment depicted, block mask pattern may include block masks 321 and 322, the block masks 321 and 322 separated by a span 325 to allow design line 313 to remain uninterrupted. However, separation 325 between block masks 321, 323 may be less than a defined minimum separation 330 for block mask pattern 320. For example, a defined minimum separation for a block mask pattern may require that any two block masks of the block mask pattern be separated by at least two design lines 310 or two metal lines. Block masks separated by less than this distance may be formed too close together and may result in defectively formed lines, as described above.

Figure 3B:
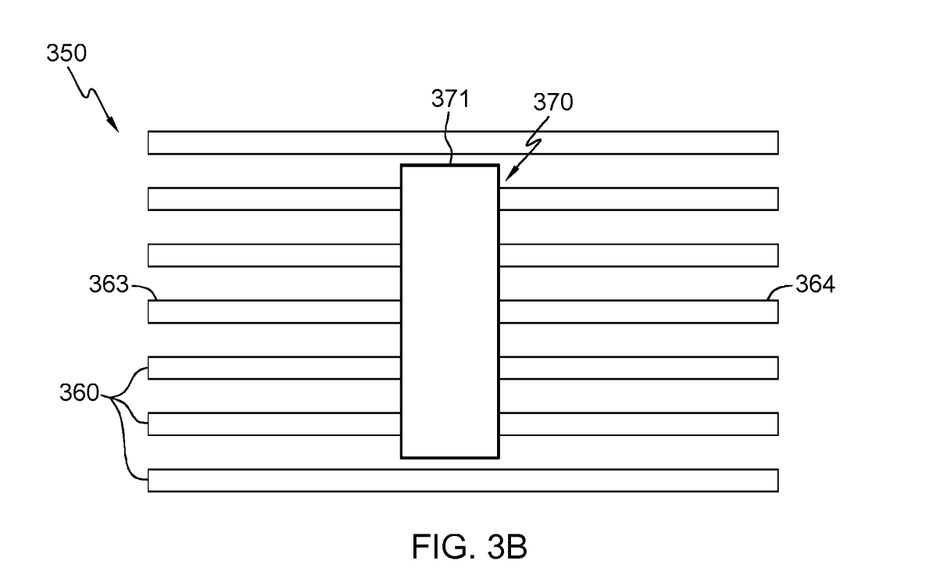

FIG. 3B depicts a circuit design 350 similar to circuit design 300 of FIG. 3A, but without the central uninterrupted design line 313 of circuit design 300. Instead, circuit design 350 has separated central design lines 363 and 364, similar to other adjacent design lines 360 of circuit design 350. A block mask pattern 370 corresponding to circuit design 350 may include one block mask 371, instead of two separate block masks. As noted above for FIG. 3A, block mask pattern 370 may be generated after routing by a separate decomposition process and not be visible to or checked by the route tool. Because block mask 371 is not close to another block mask, unlike block masks 321 and 322 in FIG. 3A, block mask pattern 370 may not violate any design rules for circuit design 350. Unlike circuit design 300, which should fail a design rule check, circuit design 350 should pass a design rule check.

Figure 3C:
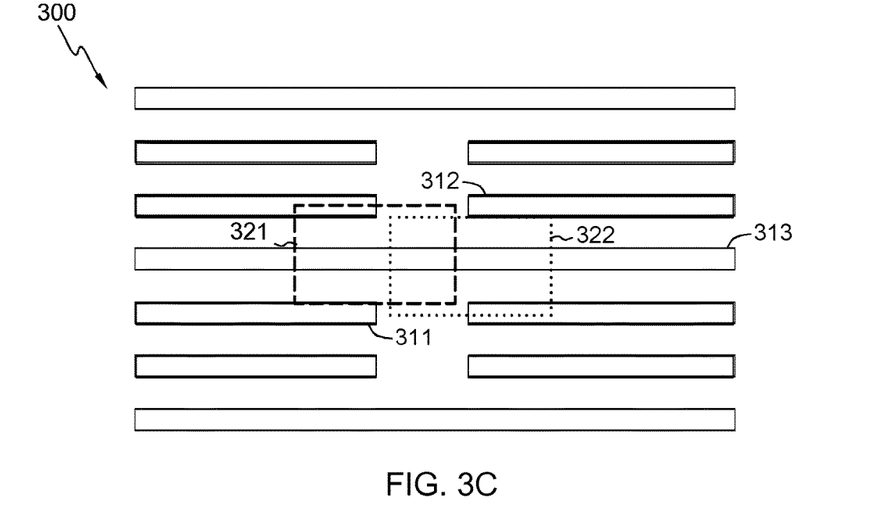
Figure 3D:
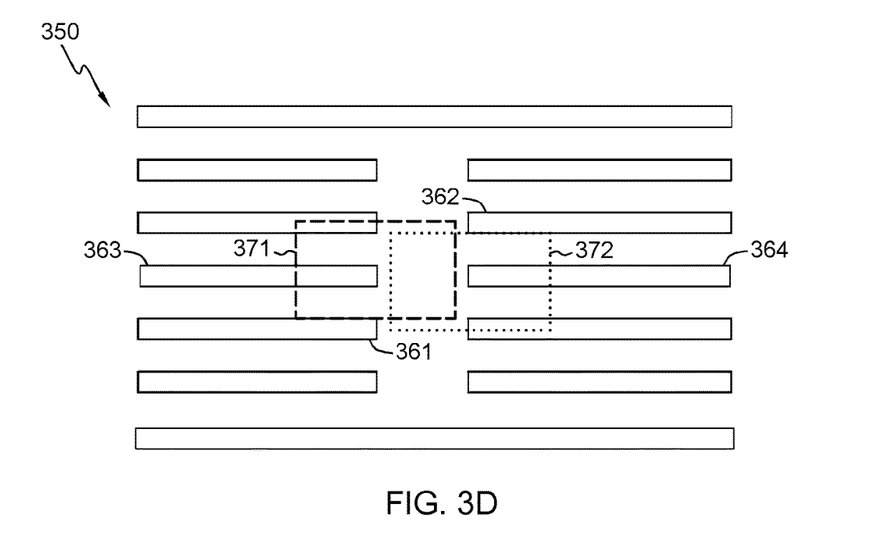

FIGS. 3C and 3D illustrate circuit designs 300 and 350, respectively, undergoing the same design rule check process in the process of metal design line routing. As illustrated previously, no block mask pattern will be generated by the route tool and no block mask design rule check will be done in the routing process. Therefore, metal line design rule check must be designed to ensure that block mask pattern can be successfully manufactured, which, however, is not practical in some specific designs. In FIG. 3C, design line ends 311 and 312 may be examined by a metal line design rule check process. Examples of keep-out regions 331 and 332, associated with design line ends 311 and 312 respectively, are depicted in FIG. 3C; other possible keep-out regions are not depicted here for simplicity. As FIG. 3C illustrates, ends of other design lines 310 fall within keep-out regions 311 and 312, thus circuit design 300 should fail a design rule check. As discussed above, the portion of design line 313 falling within keep-out regions 331 and 332 does not, by itself, cause the circuit design 300 to fail the design rule check because those portions of design line 313 are not ends of design line 313. However, the presence of design line 313 would require the placement of block masks 321 and 322, as depicted in FIG. 3A, in block mask pattern 320 for proper formation of a circuit layer according to circuit design 300.

FIG. 3D depicts circuit design 350 undergoing the same design rule check process as circuit design 300. Here, design lines 361 and 362 correspond to design lines 311 and 312, respectively, in FIG. 3A. As well, keep-out regions 381 and 382 are associated with design lines 361 and 362, similar to keep-out regions 321 and 322 in FIG. 3A. Applying the same design rule check process to circuit design 350 also results in the circuit design 350 failing the design rule check because ends of some design lines 310 fall within keep-out regions 381 and 382. However, unlike circuit design 300, circuit design 350 should pass the design rule check because the required block mask pattern 370 would not violate any design rules. If both circuit designs 300 and 350 were part of a larger circuit design for an integrated circuit layer, the design rule check process might incorrectly identify portions of the circuit design that need to be corrected, such as the portion depicted by circuit design 350. However, if the parameters of the design rule check were adjusted in order to correctly identify circuit design 350 as passing the design rule check, the same design rule check would likely identify circuit design 300 as passing the design rule check as well. While multiple iterations of the design rule checking process could be carried out to properly check both circuit designs 300 and 350, the time and costs involved in carrying out multiple iterations may be prohibitively high. Therefore, there is a need for metal design rule check that can successfully fail the design as shown in FIG. 3C while passing the design as shown in FIG. 3D.

FIGS. 4A-4F depict one embodiment of a process for performing a design rule check that may address issues with design rule check processes as described herein. Performing the design rule check may be done automatically, for example by a design rule checking tool. In exemplary embodiments performing the design rule check may include forming a verification pattern for the circuit design, as further described below. The verification pattern may include a plurality of verification lines and a plurality of verification regions. The verification lines may be defined, in part, by one or more adjacent design line ends. One or more verification regions of the plurality of verification regions may be defined, in part, by one or more critical dimensions of the circuit design, and may be associated with and connected to one verification line of the plurality of verification lines. The verification regions of the verification pattern may be similar to "keep-out regions" as described above. The design rule check may further include checking the verification pattern for any verification line that overlaps a verification region, which may be a verification region associated with another verification line of the verification pattern.

Figure 4A:
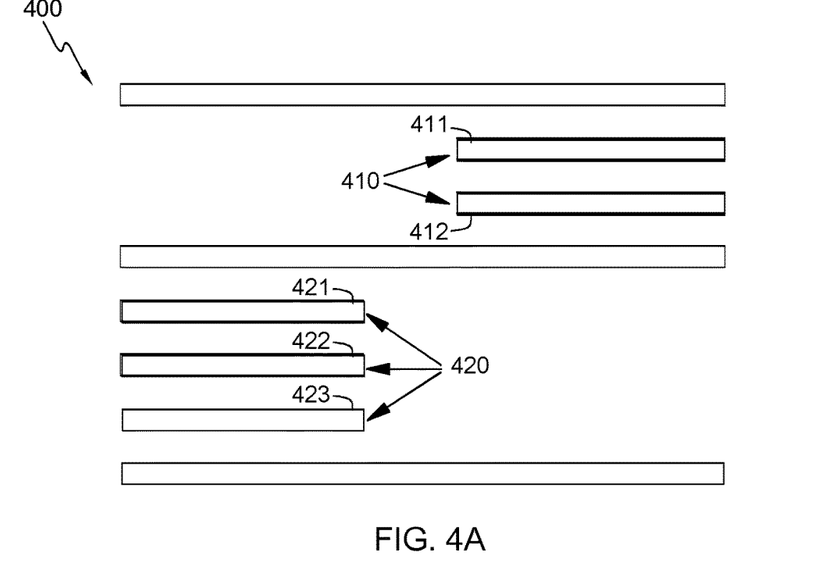
FIGS. 4A-4F depict one embodiment of a process for automatically performing design rule checking, in which a verification pattern is formed that overcomes the problems and limitations illustrated by FIGS. 3A-3D, in accordance with one or more aspects of the present invention.

FIG. 4A depicts an embodiment of a circuit design 400 including a plurality of design lines that may be provided and that may undergo a design rule check, using a verification pattern formed as described further below, prior to being used for fabrication of an integrated circuit layer. Forming of the verification pattern may include, for example, identifying one or more adjacent design lines having adjacent design line ends. Identifying the one or more adjacent design lines having the one or more adjacent design line ends may include identifying, for example, a first design line and a second design line that are adjacent in a direction transverse to the defined direction of the design lines of circuit design 400. A separation, in the defined direction of the design lines, between first design line end and second design line end may be determined, and the first design line end and second design line end may be defined to be adjacent design line ends if the separation is determined to be equal to or less than a defined minimum separation. If the first design line end and second design line end have a separation greater than the defined minimum separation, then the first and second design line ends are defined to not be adjacent line ends (see FIGS. 6A-6C).

For example, in circuit design 400 of FIG. 4A, horizontal design lines with design line ends 411 and 412 may be identified 410 as being vertically adjacent to each other. A separation in the horizontal direction (i.e., the defined direction of the design lines) between first design line end 411 and second design line end 412 may be determined, and the separation compared to a defined minimum separation. As FIG. 4A illustrates, first and second design line ends 411, 412 have a separation of zero in the defined direction (e.g., horizontal) of the design lines, thus first and second design line ends 411, 412 may be identified as being adjacent design line ends for the purposes of forming a verification pattern. It may be noted that a separation between first design line end 411 and second design line end 412 in a direction transverse to the defined direction, such as a vertical separation as illustrated, may not define whether first design line end 411 and second design line end 412 are adjacent design line ends, however such a transverse separation may facilitate identifying design lines that are adjacent in the direction transverse to the defined direction.

As another example, another first design line end 421 and second design line end 422 may also be identified 420 as being adjacent design line ends within circuit design 400. The process of forming a verification line may further include identifying a third design line 423 adjacent to second design line 422 and determining a separation, in the defined direction, between second design line end 422 and third design line end 423. If the separation is less than the defined minimum separation, then first design line end 421, second design line end 422, and third design line end 423 together may be defined to be adjacent line ends. In general, as long as any two adjacent design lines within a group of design lines have adjacent design line ends as defined herein, a group of adjacent design line ends may have any number of adjacent design line ends.

The defined minimum separation, in the defined direction of the design lines, may be defined, in one example, to be zero. That is, for a define minimum separation of zero, two design line ends are defined to be adjacent only when the design line ends are aligned so that a verification line spanning the design line ends is a straight line. In another example, as further illustrated in the embodiments depicted in FIGS. 6A-6C, the defined minimum separation may be defined by a critical dimension of a block mask pattern having a plurality of masking blocks, where the block mask pattern is designed to be used to form the integrated circuit layer according to the circuit design. For example, a critical dimension of the block mask pattern may be a minimum length dimension of a masking block of the plurality of masking blocks, such as a minimum height or minimum width of a masking block. Generally, block mask patterns may be formed on a reticle and may include a plurality of masking blocks. The masking blocks may be regular or irregular polygons, as determined in part by a corresponding circuit design, and may have one or more minimum length dimensions, such as a minimum height dimension or minimum width dimension. Minimum length dimensions of masking blocks may be defined, in part, by a wavelength of light used by a lithography tool, as masking blocks having sizes much smaller than this wavelength may undesirably increase diffraction and interference effects, potentially resulting in a greater number of defects on the fabricated circuit layer. Minimum length dimensions of masking blocks may also be defined by a minimum block size that can be accurately formed on the reticle.

Figure 4B:
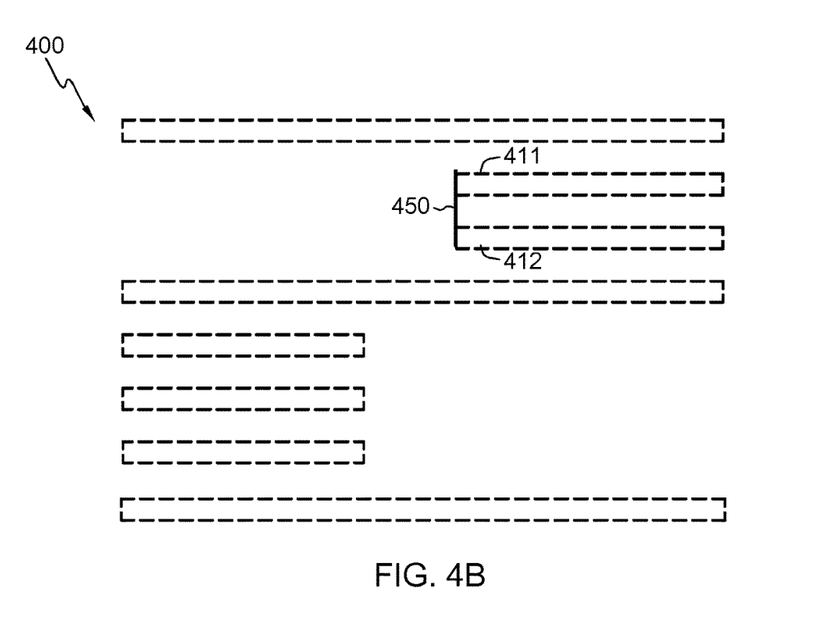

FIG. 4B depicts one embodiment of forming one verification line 450 of a plurality of verification lines for a verification pattern that may be used to perform design rule checking of circuit design 400. As depicted in FIG. 4A, first design line end 411 and second design line end 412 may be identified as being the one or more adjacent design line ends. Verification line 450 may be formed to span the one or more adjacent line ends 411 and 412, and thus may span first design line end 411, second design line end 412, and a space between first and second design line ends 411, 412, as shown. Forming verification line 450 may be considered "grouping" first and second design line ends 411 and 412 for design rule check purposes. Verification line 450 is not formed as part of circuit design 400 and does not alter circuit design 400; verification line 450, and associated verification regions formed as described in the examples below, is part of a separate verification pattern formed for the design rule checking processes described herein. In one example, a verification line may include only a single design line end.

Figure 4C:
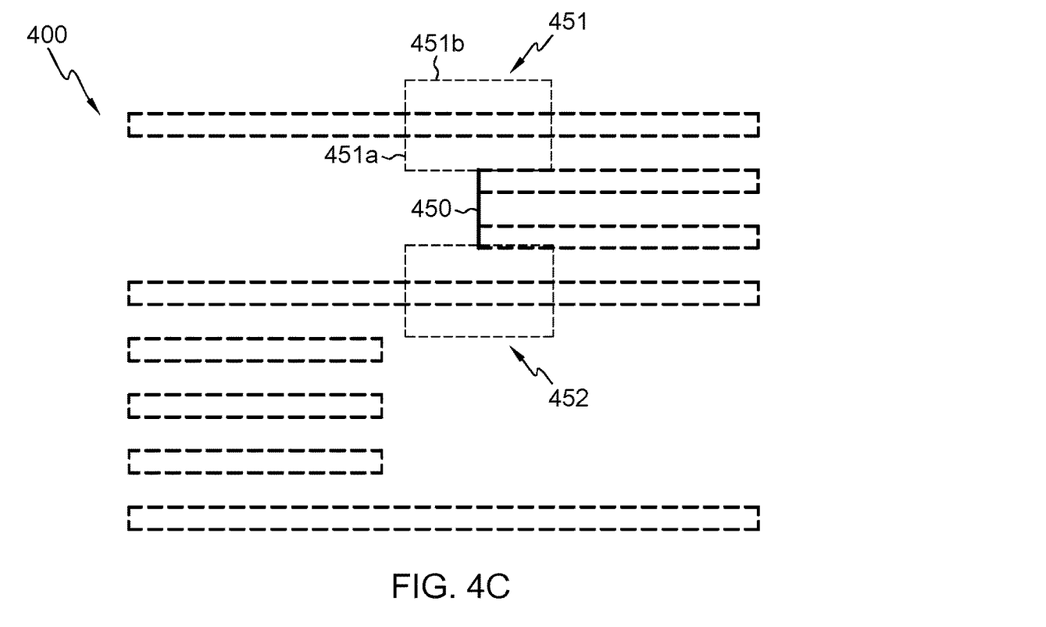

FIG. 4C depicts one embodiment of forming one or more verification regions 451, 452 that are associated with and connected to the one verification line 450 of a plurality of verification lines of the verification pattern. Verification region 451, for example, may be rectangular region having one or both of a height 451a and width 451b defined by one or more critical dimensions of the circuit design 400. A critical dimension of circuit design 400 may, for example, be a minimum separation, in the defined direction, between two co-linear design lines of the plurality of design lines. In another example, one or both of the height and width of the rectangular region may be defined by one or more critical dimensions of a block mask pattern including a plurality of masking blocks, such as a block mask pattern as previously described herein. For example, one critical dimension of a block mask pattern may be a minimum length dimension of a masking block of the plurality of masking blocks. In another example, a critical dimension of a block mask pattern may be a defined minimum separation between two or more masking blocks of the block mask pattern. Verification region 451 may be associated with and connected to verification line 450 at one end of verification line 450. A side of verification region 451 connected to verification line 450 may be centered with respect to verification line 450, for example as depicted in FIG. 4C. Verification region 452, which may be a rectangular region similar to verification region 451, may be associated with and connected to verification line 450 at another end of verification line 450. A side of verification region 452 connected to verification line 450 may be centered with respect to verification line 450, as in the example embodiment depicted in FIG. 4C.

Figure 4D:
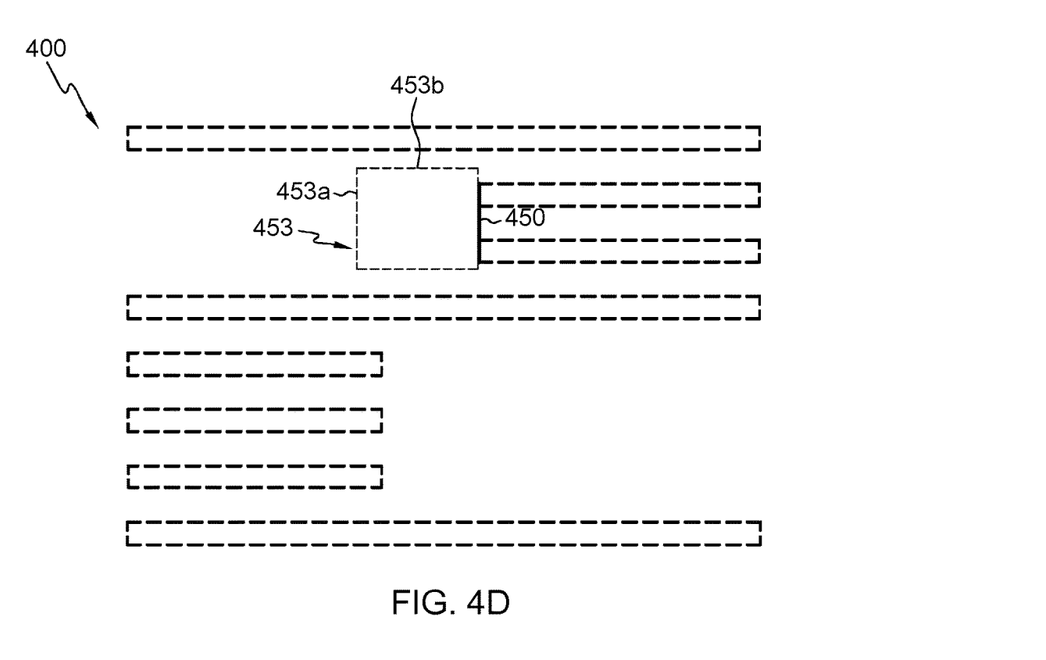

FIG. 4D depicts another embodiment of forming one or more verification regions 453 that are associated with and connected to the one verification line 450 of a plurality of verification lines of the verification pattern. Verification region 453, for example, may be rectangular region having one or both of a height 453a and width 453b defined by one or more critical dimensions of the circuit design 400, such as a separation, in the defined direction of the design lines, between two co-linear design lines of the plurality of design lines. In another example, one or both of the height and width of the rectangular region may be defined by one or more critical dimensions of a block mask pattern including a plurality of masking blocks, such as a defined minimum separation between two or more masking blocks or a minimum length dimension of a masking block the block mask pattern. Verification region 453 may be associated and connected to verification line 450 at, for example, a central portion of verification line 450. A side of verification region 453 connected to verification line 450 may be centered with respect to verification line 450, for example as depicted in FIG. 4D.

Figure 4E:
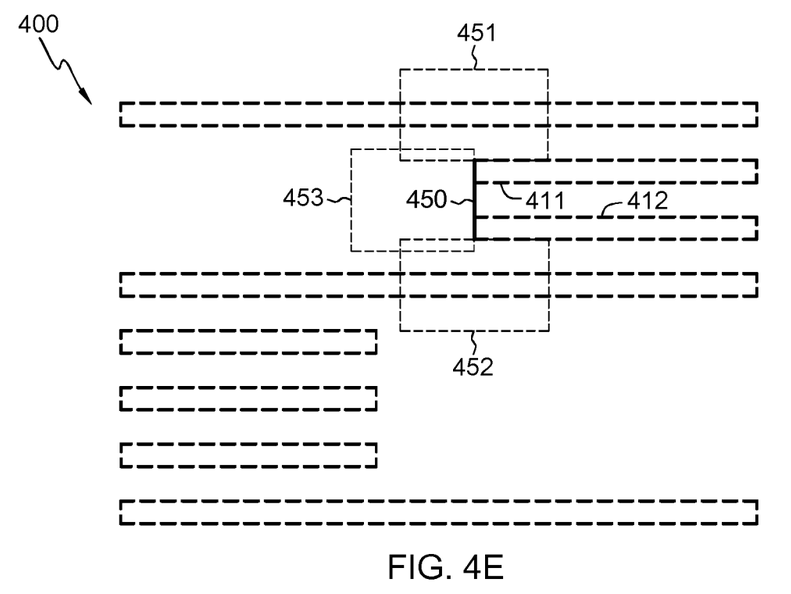

FIG. 4E depicts an embodiment of forming one or more verification regions of a verification pattern including each of verification regions 451, 452, and 453 as described above. In exemplary embodiments, a verification line such as verification line 450 may have multiple verification regions associated with and connected to the verification line 450. Verification regions 451, 452, and 453 may overlap, as FIG. 4E depicts, or may not overlap at all, depending in part on the span of verification line 450 and the dimensions of the verification regions, as defined by the one or more critical dimensions of circuit design 400.

Figure 4F:
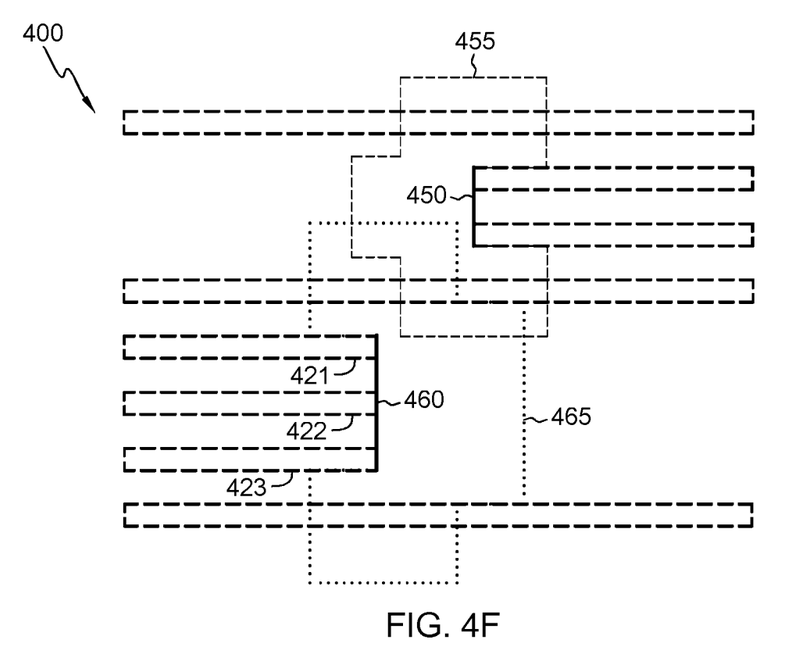

FIG. 4F depicts the circuit design 400 of FIGS. 4B-4E with another verification line 460 spanning adjacent design line ends 421, 422, and 423, and one or more verification regions 465 associated with and connected to verification line 460. For simplicity, the one or more verification regions 455 associated with verification line 450 and the one or more verification regions 465 associated with verification line 460 are depicted in FIG. 4F as single, contiguous verification regions 455 and 465 rather than as multiple overlapping verification regions for each verification line. Those with skill in the art may note, however, that the process of forming the verification pattern as described herein may include, in alternative embodiments, concatenating one or more verification regions associated with a verification line into a single verification region associated with the verification line.

FIG. 4F also depicts, in part, checking the verification pattern for any verification line overlapping a verification region, as part of automatically performing a design rule check of the circuit design. For example, the design rule checking tool may check verification region 455 for any verification line, such as verification line 460, overlapping verification region 455. Similarly, the design rule checking tool may check verification line 450 to see if verification line 450 overlaps any verification region, such as verification region 460. In particular, the design rule checking process may check for any one verification line, of a plurality of verification lines, that has a verification line end overlapping a verification region associated with another verification line of the plurality of verification lines. As the example of FIG. 4F depicts, neither verification line 450 nor 460 has a verification line end that overlaps with verification regions 465 and 455, respectively. Thus, circuit design 400 may be determined by the design rule checking tool to pass the design rule check.

As discussed previously, in some examples some design lines of a circuit design 400 may overlap with verification regions 455, 465, but the overlap of these design lines may not be relevant to the design rule check. The design rule checking processes described herein may eliminate the need to perform checking of individual design lines of the circuit design, as the design rule checking processes herein may simply use the verification pattern to determine whether any one verification line has a verification line end that overlaps with a verification region associated with another verification line.

Figure 5A:
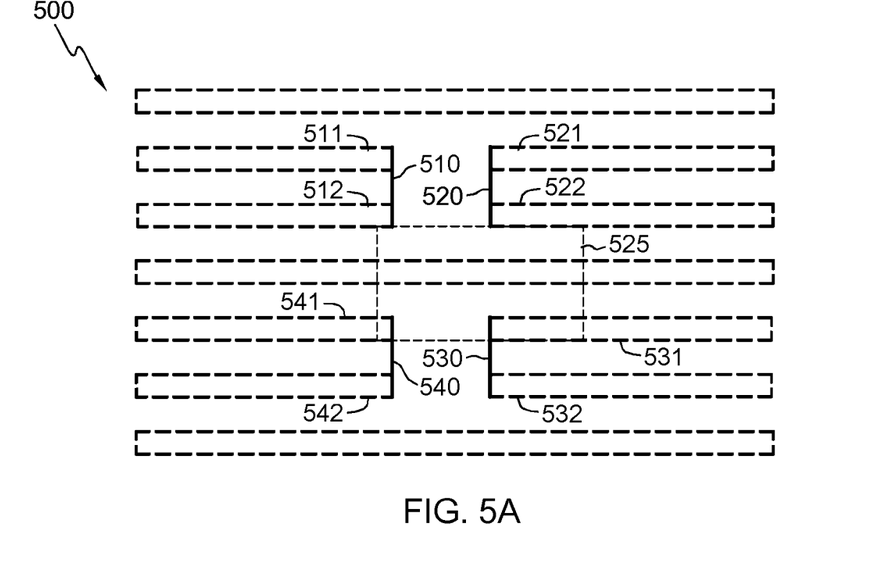
FIGS. 5A-5B depict the circuit designs of FIGS. 3A-3D undergoing one embodiment of a process for automatically performing design rule checking as depicted by FIGS. 4A-4F, in accordance with one or more aspects of the present invention; and, FIGS. 6A-6C depict one alternative embodiment of a process for automatically performing design rule checking, in accordance with one or more aspects of the present invention.
Figure 5B:
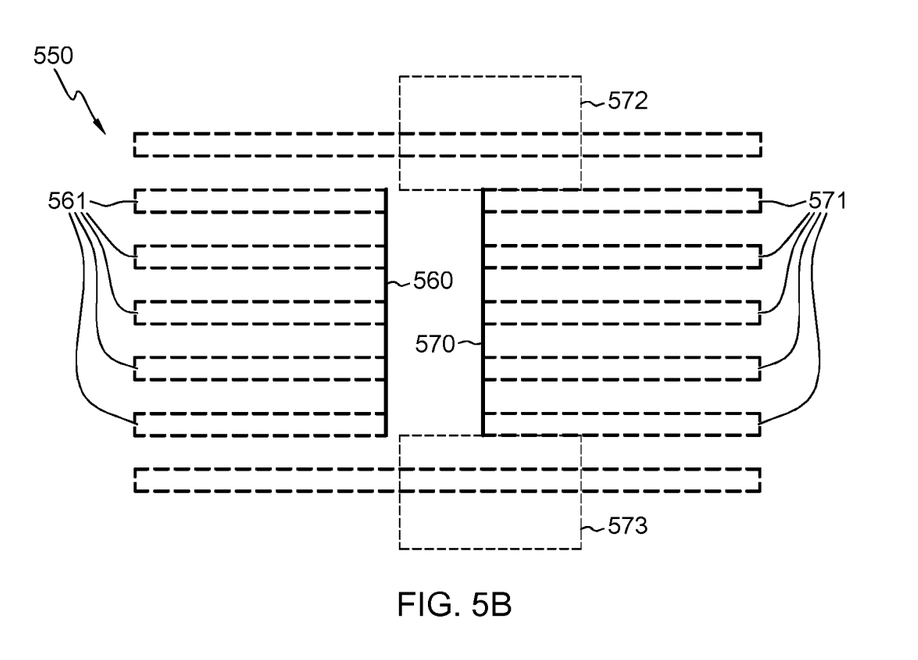

FIGS. 5A and 5B depict embodiments of the design rule checking process described above as applied to the circuit designs of FIGS. 3A and 3B. FIG. 5A depicts circuit design 500, similar to circuit design 300 of FIG. 3A, with a portion of a verification pattern formed including verification lines 510, 520, 530, and 540, with one verification region 525 of one or more verification regions associated with and connected to verification line 520. Additional verification regions of the verification pattern associated with verification lines 510, 520, 530, 540 are not depicted in FIG. 5A for the sake of simplicity. As shown, verification line 530 spanning adjacent design line ends 531, 532 has a verification line end that overlaps with verification region 525. As well, verification line 540 spanning adjacent design line ends 541, 542 has a verification line end that overlaps with verification region 525. Thus, circuit design 500 would fail a design rule checking process as described herein, as desired. As one with skill in the art may recognize, a similar verification region associated with verification line 510, although not depicted in FIG. 5A for simplicity, may also overlap with the verification line ends of verification lines 540 and 530. Similarly, a verification region associated with verification line 530 may overlap with verification line ends of verification lines 510 and 520, and so on. In practice, the design rule checking process may fail the circuit design 500 after checking and identifying one such overlap between a verification region 525 and another verification line 530, 540, or may identify several or all such overlaps between verification regions and verification lines before failing the circuit design 500. Ideally, the design rule checking process may automatically report failures in circuit design 500 so that circuit design 500 and/or an associated block mask pattern may be modified.

FIG. 5B depicts circuit design 550, similar to circuit design 350 of FIG. 3B, with a portion of a verification pattern formed including verification lines 560 and 570, as well as verification regions 572 and 573 associated with and connected to verification line 570. Verification line 560 spans the design line ends of design lines 561, as design lines 561 have adjacent design line ends. Similarly, verification line 570 spans the design line ends of design lines 571. Additional verification regions of the verification pattern associated with verification line 560 are not depicted in FIG. 5B for the sake of simplicity. As shown, no verification line end of verification line 560 overlaps any verification region 572, 573 associated with verification line 570. Thus, circuit design 550 may pass a design rule checking process as described herein, as desired. If circuit designs 500 and 550 were each circuit design portions of a larger circuit design, a design rule checking process as described herein may properly identify circuit design portion 500 as failing the check, and also properly identify circuit design portion 550 as passing the check.

Figure 6A:
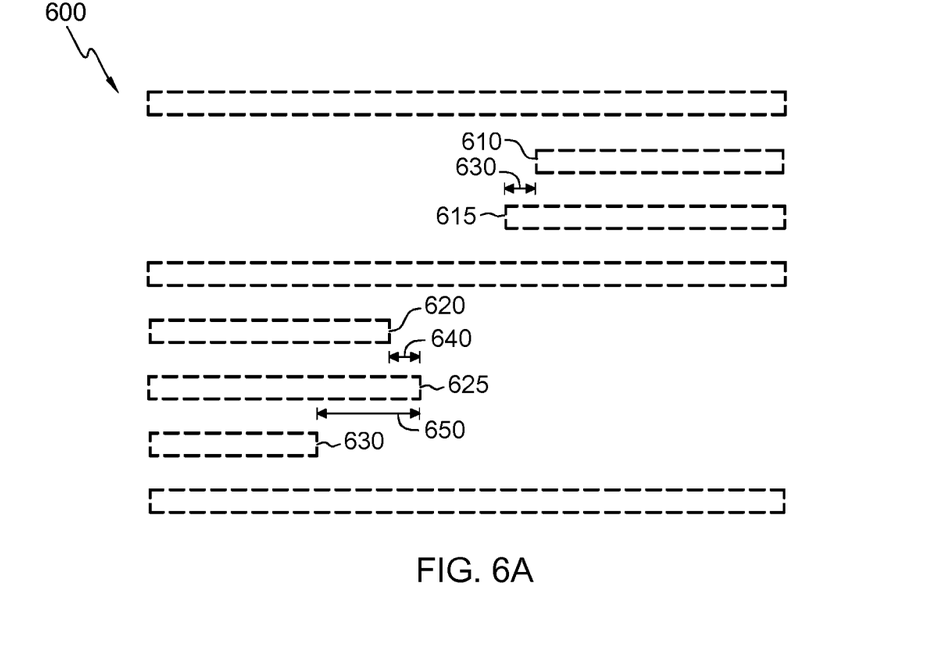
Figure 6B:
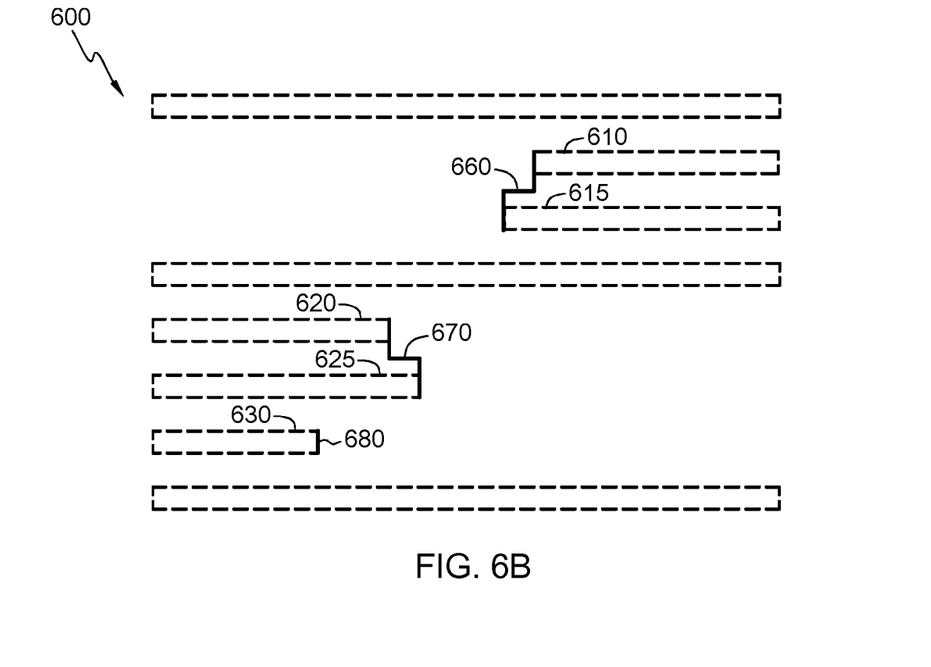
Figure 6C:
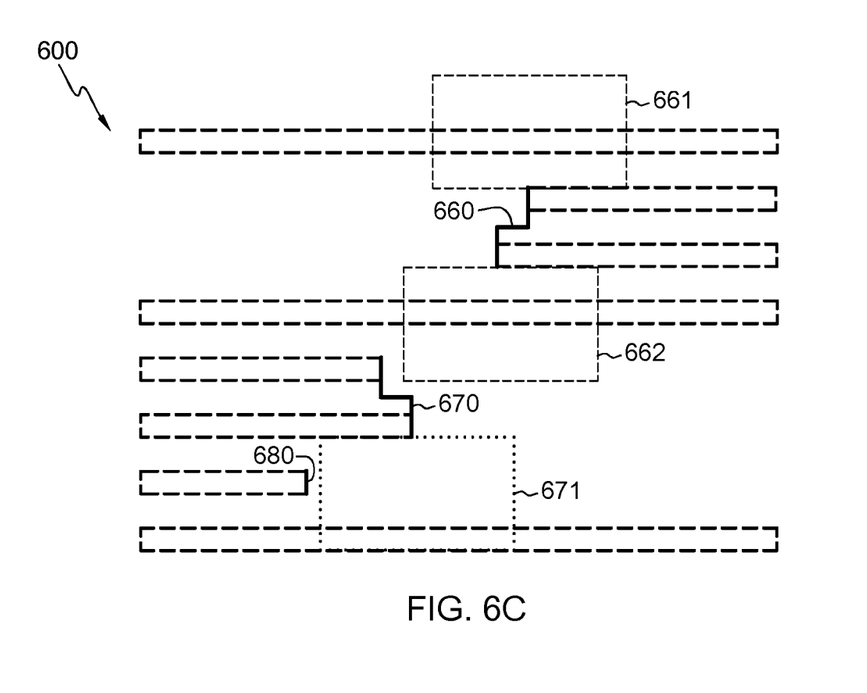

FIGS. 6A-6C depict another embodiment of a process for performing a design rule check that includes forming a verification pattern for a circuit design 600, as further described below. FIG. 6A depicts another circuit design 600 including a plurality of design lines that may be provided and that may undergo a design rule check prior to being used for fabrication of an integrated circuit layer. Similar to previously described embodiments, circuit design 600 includes a plurality of design lines oriented in a defined direction, for example, design lines oriented in a horizontal direction as shown in FIG. 6A. First design line end 610 and second design line end 615 may, for example, be defined as adjacent design line ends, as the respective first and second design lines are adjacent in a direction transverse to (vertical) the defined direction, and first design line end 610 and second design line end 615 are separated by a separation 630 less than a defined minimum separation. As described previously, a defined minimum separation may be defined by a critical dimension of a block mask pattern, such as a minimum length dimension of a masking block of the block mask pattern. Similarly, another first design line end 620 and another second design line end 625 may be separated by a separation 640 less than the defined minimum separation, and thus may be defined to be adjacent design line ends. In the exemplary embodiment depicted in FIG. 6A, a third design line end 630 may not be defined to be adjacent to second design line end 625 if the separation 650 between second design line end 625 and third design line end 630 is greater than the defined separation minimum.

FIG. 6B depicts circuit design 600 from FIG. 6A with a portion of a verification pattern being formed, including verification lines 660, 670, and 680. As first design line end 610 and second design line end 615 are defined to be adjacent design line ends, verification line 660 may be formed and may span first design line end 610, second design line end 615, and a space separating first design line end 610 and second design line end 615, as depicted in the example of FIG. 6B. Similarly, design line ends 620 and 625 are defined to be adjacent design line ends, and verification line 670 may be formed to span design line ends 620 and 625 and a space separating design line ends 620, 625. Design line end 630, in the example of FIG. 6B, is not defined to be adjacent to another design line end, such as design line end 625. Verification line 680 may be formed to span design line end 630, and may not span another design line end or space between design line ends.

FIG. 6B depicts verification line 660 as including multiple portions, such as a portion spanning design line end 610 and a portion of the space separating design line ends 610 and 615, another portion spanning design line end 615 and another portion of the space separating design line ends 610 and 615, and a third portion connecting the portion with the other portion. Verification line 670 includes similar multiple portions, as depicted by FIG. 6B. The arrangement of the multiple portions as depicted in FIG. 6B are only one exemplary embodiment of verification lines 660, 670 that may include multiple portions spanning design line ends 610, 615 and 620, 625, respectively, and alternative forms of verification lines spanning adjacent design line ends may also be formed in a verification pattern according to the methods disclosed herein.

FIG. 6C depicts circuit design 600 with a portion of the verification pattern overlaying circuit design 600, including verification lines 660, 670, and 680 as well as one or more verification regions 661, 662, 671 of the verification pattern formed. Verification regions 661 and 662, in the example of FIG. 6C, are associated with and connected to verification line 660 at verification line ends of verification line 660, while verification region 671 is associated with and connected to verification line 670 at one verification line end of verification line 670. Additional verification regions associated with verification lines 660, 670, and 680, which may also be formed as part of the verification pattern, are omitted for purposes of simplicity. Automatically performing a design rule check of circuit design 600 may include, for example, checking verification region 662 for any verification line, such as verification line 670, overlapping with verification region 662. As no verification line overlaps verification region 662, and particularly no verification line end overlaps verification region 662, this portion of circuit design 600 may pass the design rule check process. Similarly, checking verification region 671 for overlap with any verification line, such as verification line 680, shows that no verification line overlaps with verification region 671, so this portion of circuit design 600 may also pass the design rule check process. Additional checks of other verification regions and verification lines, such as verification 661 and verification line 680, may also be included in the design rule check process.

As those with skill in the art may appreciate, the processes described herein for forming a verification pattern as part of automatically performing a design rule check process may be modified to accommodate many circuit designs for different integrated circuit layers, such as metallization layers and circuit layers to be formed by a double-patterning process, and such modifications are contemplated as being within the scope of this disclosure. As well, the processes disclosed herein are not limited to being performed by specific design rule checking tools or routing tools, and may be modified or adapted to other types of lithography tools or other circuit structure fabrication tools to improve the performance of these tools and improve the fabrication of circuit structures, as described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method comprising:
   providing a circuit design for an integrated circuit layer, the circuit design comprising a plurality of design lines oriented in a same defined direction;
   automatically performing a design rule check of the circuit design by a design rule checking tool, the automatically performing comprising:
      forming, by the design rule checking tool, a verification pattern for the circuit design, the verification pattern comprising a plurality of verification lines and a plurality of verification regions, the verification lines being defined, in part, by one or more adjacent design line ends, wherein one or more verification regions of the plurality of verification regions are defined, in part, by one or more critical dimensions of the circuit design and are associated with and connected to one verification line of the plurality of verification lines; and
      checking, by the design rule checking tool, the verification pattern for any verification line overlapping a verification region.

2. The method of claim 1, wherein the circuit design fails the design rule check if any one verification line of the plurality of verification lines has a verification line end overlapping a verification region associated with another verification line of the plurality of verification lines.

3. The method of claim 1, wherein forming the verification pattern further comprises forming the plurality of verification lines, wherein forming one verification line of the plurality of verification lines comprises identifying one or more adjacent design lines having the one or more adjacent design line ends, and forming the one verification line to span the one or more adjacent design line ends.

4. The method of claim 3, wherein identifying one or more adjacent design lines having the one or more adjacent design line ends comprises:
identifying a first design line and a second design line, the first and second design lines being adjacent in a direction transverse to the defined direction;
determining a separation, in the defined direction, between a first design line end of the first design line and a second design line end of the second design line; and
defining the first design line end and second design line end to be adjacent design line ends if the separation is equal to or less than a defined minimum separation, or defining the first design line end and second design line end to not be adjacent line ends if the separation is greater than the defined minimum separation.

5. The method of claim 4, wherein the defined minimum separation is defined to be zero.

6. The method of claim 4, wherein the defined minimum separation is defined by a critical dimension of a block mask pattern, the block mask pattern comprising a plurality of masking blocks and being designed to be used to form the integrated circuit layer according to the circuit design.

7. The method of claim 6, wherein the critical dimension of the block mask pattern comprises a minimum length dimension of a masking block of the plurality of masking blocks.

8. The method of claim 4, wherein the separation is less than the defined minimum separation, and wherein the one verification line spans the first design line end, the second design line end, and a space separating the first design line end from the second design line end.

9. The method of claim 4, wherein the separation is greater than the defined minimum separation and at least the first design line end is not defined to be adjacent to any second design line end, and wherein the one verification line spans the first design line end.

10. The method of claim 4, wherein the separation is a first separation, and further comprising:
identifying at least one third design line, the at least one third design line being adjacent to the second design line in the direction transverse to the defined direction;
determining a second separation, in the defined direction, between a third design line end of the third design line and the second design line end of the second design line; and
defining the first design line end, the second design line end, and the third design line end to be adjacent design line ends if the second separation is equal to or less than a defined minimum separation.

11. The method of claim 10, wherein the first design line end, the second design line end, and the third design line end are defined to be adjacent design line ends, and wherein the one verification line spans the first design line end, a space separating the first design line end from the second design line end, the second design line end, a space separating the second design line end from the third design line end, and the third design line end.

12. The method of claim 1, wherein at least one verification region of the one or more verification regions comprises a rectangular region, wherein one or both of the height and width of the rectangular region is defined by one or more critical dimensions of the circuit design.

13. The method of claim 12, wherein one critical dimension of the one or more critical dimensions of the circuit design comprises a minimum separation, in the defined direction, between two co-linear design lines of the plurality of design lines.

14. The method of claim 12, wherein one or both of the height and width of the rectangular region is defined by one or more critical dimensions of a block mask pattern, the block mask pattern comprising a plurality of masking blocks and being designed to be used by a routing tool to form the integrated circuit layer according to the circuit design.

15. The method of claim 14, wherein one critical dimension of the one or more critical dimensions of the block mask pattern comprises a minimum length dimension of a masking block of the plurality of masking blocks.

16. The method of claim 14, wherein one critical dimension of the one or more critical dimensions of the block mask pattern comprises a defined minimum separation between two or more masking blocks.

17. The method of claim 1, wherein one verification region of the one or more verification regions is connected to the one verification line at one verification line end of the one verification line.

18. The method of claim 1, wherein one verification region of the one or more verification regions is connected to the one verification line at a central portion of the one verification line.

19. The method of claim 1, wherein the integrated circuit layer is an integrated circuit layer to be formed, at least in part, by a self-aligned double patterning process.

20. The method of claim 1, wherein the integrated circuit layer is a metallization layer of a circuit structure.

* * * * *